US010283036B2

(12) United States Patent
Yoo et al.

(10) Patent No.: US 10,283,036 B2
(45) Date of Patent: May 7, 2019

(54) LUMINANCE CORRECTION SYSTEM AND METHOD FOR CORRECTING LUMINANCE OF DISPLAY PANEL

(71) Applicant: Samsung Display Co., Ltd, Yongin-si, Gyeonggi-do (KR)

(72) Inventors: Jeong-Geun Yoo, Yongin-si (KR); In-Hwan Kim, Asan-si (KR); Ji-Hwan Yoon, Suwon-si (KR); Hyun-Ho Lee, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 138 days.

(21) Appl. No.: 15/439,563

(22) Filed: Feb. 22, 2017

(65) Prior Publication Data

US 2017/0249890 A1 Aug. 31, 2017

(30) Foreign Application Priority Data

Feb. 26, 2016 (KR) ........................ 10-2016-0023307

(51) Int. Cl.
*G06F 1/00* (2006.01)
*G09G 3/20* (2006.01)

(52) U.S. Cl.
CPC ............. *G09G 3/2074* (2013.01); *G09G 3/20* (2013.01); *G09G 3/2077* (2013.01); *G09G 3/2092* (2013.01); *G09G 2320/029* (2013.01); *G09G 2320/0233* (2013.01); *G09G 2320/0673* (2013.01); *G09G 2360/147* (2013.01); *G09G 2360/16* (2013.01)

(58) Field of Classification Search
CPC .. G09G 3/2074; G09G 3/2077; G09G 3/2092; G09G 5/10; G06T 11/60; G06F 3/038; H04N 5/217
See application file for complete search history.

(56) References Cited

U.S. PATENT DOCUMENTS

2014/0218384 A1* 8/2014 Ito ...................... H04N 5/23229 345/589
2016/0165198 A1* 6/2016 Ouchi .................. H04N 9/3182 348/744

FOREIGN PATENT DOCUMENTS

KR 10-2015-0048394 A 5/2015
KR 10-2015-0050244 A 5/2015
KR 10-2015-0115080 A 10/2015

* cited by examiner

*Primary Examiner* — Michael A Faragalla
(74) *Attorney, Agent, or Firm* — Innovation Counsel LLP

(57) ABSTRACT

A luminance correction system includes an image pickup device configured to pick up a test image and generate pickup data, a parameter calculation device configured to calculate a first target luminance that is a maximum luminance of a reference area in a display panel and a detected maximum luminance that is a luminance of a correction target sub-pixel based on the pickup data with respect to a maximum grayscale, determine a second target luminance by correcting the first target luminance, and calculate correction parameters, and a display device including the display panel, the display device configured to compensate the input grayscale of the correction target sub-pixel to a target grayscale based on the correction parameters and generate a data voltage by adjusting upward a gamma voltage corresponding to the target grayscale.

18 Claims, 8 Drawing Sheets

LUMINANCE CORRECTION SYSTEM AND METHOD FOR CORRECTING LUMINANCE OF DISPLAY PANEL

CROSS REFERENCE TO RELATED APPLICATION

This application claims priority to and the benefit of Korean Patent Application No. 10-2016-0023307, filed on Feb. 26, 2016 in the Korean Intellectual Property Office (KIPO), the disclosure of which is hereby incorporated by reference herein in its entirety.

BACKGROUND

1. Field

Example embodiments of the inventive concept relate to luminance correction systems. More particularly, example embodiments of the inventive concept relate to luminance correction systems for eliminating a luminance variation and methods for correcting luminance of display panels.

2. Discussion of Related Art

Recently, there have been developed various types of display devices capable of reducing the weight and volume of cathode ray tubes. Such display devices include, e.g., a liquid crystal display device (LCD), a field emission display device (FED), a plasma display panel (PDP), an organic light emitting display device (OLED), and the like.

Luminance variations of a plurality of pixels occur due to characteristics variations of the pixels, variations in the manufacturing process, and the like. Eventually, luminance spots are generated and image quality is reduced due to the luminance variations. To solve these problems, techniques for correcting luminance using picking up an image of a display panel are used.

SUMMARY

Example embodiments provide a luminance correction system for securing compensation margin in a high-grayscale area including a maximum grayscale and eliminating a luminance variation between pixels so as to eliminate a luminance spot.

Example embodiments provide a method for correcting luminance of a display panel for eliminating the luminance variation between the pixels.

According to example embodiments, a luminance correction system comprising a display device may comprise an image pickup device configured to pick up a test image displayed on a display panel displaying and generate pickup data. The luminance correction system may further comprise a parameter calculation device configured to calculate a first target luminance that is a maximum luminance of a reference area in the display panel and a detected maximum luminance that is a luminance of a correction target sub-pixel based on the pickup data with respect to a maximum grayscale, determine a second target luminance by correcting the first target luminance, and calculate correction parameters for calculating a target grayscale that compensates an input grayscale of the correction target sub-pixel. The luminance correction system may further comprise the display device including the display panel, the display device configured to compensate the input grayscale of the correction target sub-pixel to the target grayscale based on the correction parameters and generate a data voltage by adjusting upward a gamma voltage corresponding to the target grayscale.

In example embodiments, the parameter calculation device may determine the second target luminance to be lower than the detected maximum luminance.

In example embodiments, the parameter calculation device may adjust downward a grayscale-luminance function of the reference area based on the second target luminance.

In example embodiments, the parameter calculation device may not correct the first target luminance to be the second target luminance and calculate the correction parameters based on the first target luminance when the first target luminance is lower than the detected maximum luminance.

In example embodiments, the display device may adjust upward the gamma voltage such that a maximum value of the target grayscale corresponding to the second target luminance changes to be matched to the first target luminance.

In example embodiments, the maximum value of the target grayscale may be lower than the maximum grayscale.

In example embodiments, the parameter calculation device may comprise a luminance calculator configured to determine an average luminance of at least one sub-pixel included in the reference area as the first target luminance based on the pickup data having the maximum grayscale and calculate the detected maximum luminance of the correction target sub-pixel, a target luminance corrector configured to adjust downward the first target luminance to be lower than the detected maximum luminance and determine the second target luminance when the first target luminance is not lower than the detected maximum luminance. The parameter calculation device may further comprise a calculator configured to determine the correction parameters using a grayscale-luminance curve of the correction target sub-pixel and a reference grayscale-luminance curve such that luminance of the correction target sub-pixel is substantially the same as luminance of the reference area, the reference grayscale-luminance curve being a grayscale-luminance curve of the reference area.

In example embodiments, the test image may be displayed as one of a first reference grayscale, a second reference grayscale, and the maximum grayscale. The second reference grayscale may be lower than the maximum grayscale and the first reference grayscale is lower than the second reference grayscale.

In example embodiments, the luminance calculator may further calculate luminance of the reference area corresponding to each of the first and second reference grayscales and detected luminance of the correction target sub-pixel.

In example embodiments, the calculator may perform a linearization to the reference grayscale-luminance curve and the grayscale-luminance curve of the correction target sub-pixel to calculate the correction parameter.

In example embodiments, the grayscale-luminance curve of the correction target sub-pixel may correspond to an exponential function calculated based on the detected luminance and the detected maximum luminance.

In example embodiments, the target luminance corrector may adjust downward the reference grayscale-luminance curve based on the second target luminance when the first target luminance is not lower than the detected maximum luminance.

In example embodiments, the target luminance corrector may calculate the reference grayscale-luminance curve based on the first target luminance of the reference area when the first target luminance is lower than the detected maximum luminance.

In example embodiments, the display device may comprise a grayscale compensator configured to calculate a correction function having the correction parameters applied to each of predetermined grayscale sections, and compensate the input grayscale to the target grayscale using the correction function. The display device may further comprise a gamma corrector configured to adjust upward the gamma voltage corresponding to the target grayscale to be substantially the same as a gamma voltage corresponding to the input grayscale.

In example embodiments, the number of bits of the target grayscale is the same as the number of bits of data of the input grayscale.

According to example embodiments, a method for correcting luminance of a display panel may comprise generating pickup data by picking up an image displayed on the display panel, the image corresponding to a predetermined maximum grayscale. The method may further comprise calculating a first target luminance that is a maximum luminance of a reference area in the display panel and a detected luminance that is luminance of a correction target sub-pixel based on the pickup data. The method may further comprise determining a second target luminance lower than the first target luminance by correcting the first target luminance, and calculating correction parameters for correcting an input grayscale of a correction target sub-pixel to be a target grayscale based on a grayscale-luminance curve of the reference area including the second target luminance. The method may further comprise correcting the input grayscale of the correction target sub-pixel to the target grayscale based on the correction parameters, and adjusting upward a gamma voltage corresponding to the target grayscale to have a luminance corresponding to the input grayscale.

In example embodiments, the second target luminance may be determined to be lower than a detected maximum luminance detected at the correction target sub-pixel.

In example embodiments, adjusting upward the gamma voltage may correct the gamma voltage such that a maximum value of the target grayscale corresponding to the second target luminance changes to be matched to the first target luminance.

In example embodiments, calculating the correction parameters may comprise calculating the luminance of the reference area corresponding to each of a first reference grayscale and a second reference grayscale and a luminance of the correction target sub-pixel based on results by picking up the image displaying the first reference grayscale and the second reference grayscale. The calculating the correction parameters may further comprise calculating the grayscale-luminance curve of the reference area, a first reference grayscale-luminance curve of the first reference grayscale, and a second reference grayscale-luminance curve of the second reference grayscale based on the luminance of the reference area and the luminance of the correction target sub-pixel. The calculating the correction parameters may further comprise calculating the correction parameter by linearizing the grayscale-luminance curve, the first reference grayscale-luminance curve, and the second reference grayscale-luminance curve.

In example embodiments, the number of bits of the target grayscale may be the same as the number of bits of data of the input grayscale.

Therefore, the luminance correction system and the method for correcting the luminance of the display panel according to example embodiments may adjust downward the target luminance to secure (or increase) the grayscale correction margin, and perform the gamma correction that adjusts upward the gamma voltage with respect to the corrected target grayscale to recover the downward adjusted (lowered) target luminance. Thus, the accuracy of the luminance correction and luminance uniformity may be improved in a condition that the sub-pixels have various luminance variations.

BRIEF DESCRIPTION OF THE DRAWINGS

Example embodiments can be understood in more detail from the following description taken in conjunction with the accompanying drawings, in which.

DETAILED DESCRIPTION OF EMBODIMENTS

Exemplary embodiments will be described more fully hereinafter with reference to the accompanying drawings, in which various embodiments are shown.

Figure 1:
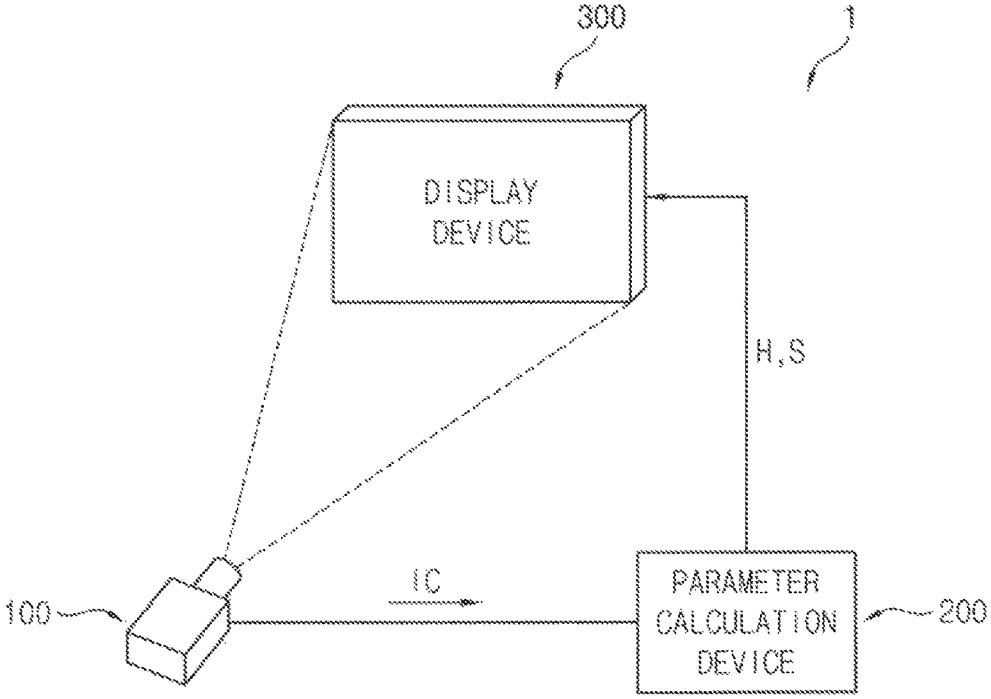
FIG. 1 is a block diagram of a luminance correction system according to example embodiments.

FIG. 1 is a block diagram of a luminance correction system 1 according to example embodiments.

Referring to FIG. 1, the luminance correction system 1 may include a camera device 100, also called an image pickup device 100, a parameter calculation device 200, and a display device 300.

The image pickup device 100 may pick up a test image displayed on a display panel displaying and generate pickup data IC. The image pickup device 100 may convert light signals picked up into electrical signals to generate the pickup data IC. In some embodiments, the pickup data IC may include picked up luminance information of the test image corresponding to a predetermined maximum grayscale. Since this is an example, the pickup data IC may include picked up luminance information of the test image corresponding to a specific reference grayscale when the display device 300 displays the test image having the reference grayscale.

The parameter calculation device 200 may calculate a first target luminance that is a maximum luminance of a reference area in the display panel and a detected maximum luminance that is a luminance of a correction target sub-pixel based on the pickup data IC. The first target luminance and the detected maximum luminance may be detected luminances by the image pickup device 100 when the display device 300 displays the test image based on maximum grayscale data (i.e., input grayscale data). The parameter calculation device 200 may determine a second target luminance by correcting the first target luminance, and calculate correction parameters H and S for calculating a target grayscale that compensate an input grayscale of the correction target sub-pixel. Here, the target grayscale may be generated by the display device 300 based on the correction parameters H and S and the input grayscale of the correction target sub-pixel. The input grayscale and the correction parameters H and S may be provided to the display device 300. The second target luminance may be determined to be lower than the first target luminance and the detected maximum luminance. The first target luminance may be adjusted downward to the second target luminance to calculate the correction parameters H and S such that a correction margin in a high-grayscale area including the maximum grayscale may be secured. The parameter calculation device 200 may be a computer device having functions or algorithms that are programmed for calculating the correction parameters H and S.

In some embodiments, the parameter calculation device 200 may adjust downward a grayscale-luminance function of the reference area based on the second target luminance. Thus, the luminance correction margin corresponding grayscales may be secured. The grayscale-luminance function (a grayscale-luminance curve) represents a change of the luminance according to a change of the grayscale. The adjustment downward of the grayscale-luminance function (the grayscale-luminance curve) defines that an adjusted luminance after the adjustment is less than before the adjustment with respect to the same grayscale variable.

In some embodiments, the parameter calculation device 200 may not correct the first target luminance to be the second target luminance and calculate the correction parameters H and S based on the first target luminance, when the first target luminance is lower than the detected maximum luminance. In this cases, since the correction margin in the high-grayscale is not necessary to secure (or increase), the first target luminance is not adjusted to the second target luminance.

The display device 300 may be an object of luminance correction. Before the display device 300 is released, the luminance correction for the display device 300 may be performed through the luminance correction system 1 according to example embodiments. The display device 300 may display the test image based on a test signal for the luminance correction. The test signal may be applied per sub-pixel. For example, the test signal may emit light from one of red, green, and blue sub-pixels when the display panel 300 includes the red, green, and blue sub-pixels. In some embodiments, the test signal may include the maximum grayscale of the display device 300 and the test image corresponding to the test signal may be displayed as the maximum grayscale. The display device 300 may compensate the input grayscale of the correction target sub-pixel to a target grayscale based on the compensation parameter H and S. The display device 300 may generate a data voltage by raising a gamma voltage corresponding to a target grayscale. Accordingly, the display device 300 may display an image in a uniform image quality.

Figure 2:
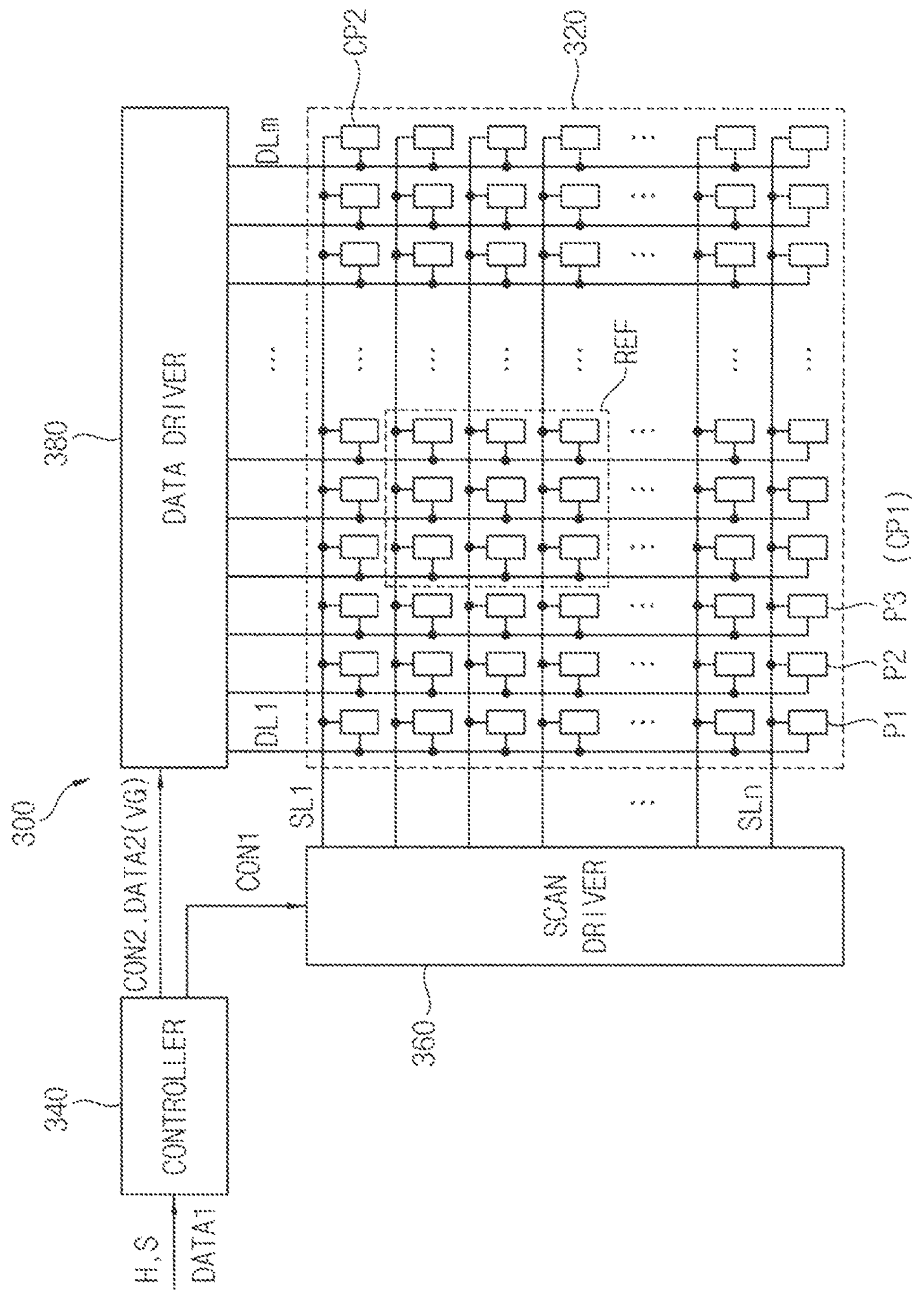
FIG. 2 is a diagram illustrating an example of a display device included in the luminance correction system of FIG. 1.

FIG. 2 is a diagram illustrating an example of a display device included in the luminance correction system of FIG. 1.

Referring to FIG. 2, the display device 300 may include a display panel 320, a controller 340, a scan driver 360, and a data driver 380.

The display panel 320 may include a plurality of sub-pixels P1, P2, and P3, which display images. That is, the sub-pixels P1, P2, and P3 may be respectively arranged at locations corresponding to crossing regions of a plurality of scan lines SL1 through SLn and a plurality of data lines DL1 through DLm. The sub-pixels P1, P2, and P3 may include a plurality of first sub-pixels P1, a plurality of second sub-pixels P2, and a plurality of third sub-pixels P3. For example, the first sub-pixels P1 may be red sub-pixels, the second sub-pixels P2 may be green sub-pixels, and the third sub-pixels P3 may be blue sub-pixels. The display panel 320 may include a reference area REF having a portion of the sub-pixels P1, P2, and P3. The reference area REF may be a reference for luminance correction. The luminance correction may be performed such that the sub-pixels P1, P2, and P3 except for the sub-pixels P1, P2, and P3 of the reference area REF emit light to have the detected luminance at the reference area REF. Accordingly, correction target sub-pixels CP1 and CP2 may be all of the sub-pixels located outside the reference area REF. For example, when input image data DATA1 (i.e., input grayscale) having the same input grayscales are applied to the controller 340, the grayscale correction and the luminance correction may be performed such that luminance of the correction target sub-pixels CP1 and CP2 may be substantially the same as the luminance of the reference area REF.

The controller 340 may receive correction parameters H and S for the grayscale compensation from a parameter calculation device. The controller 340 may include a grayscale compensator configured to calculate a correction function having the correction parameters applied to each of predetermined grayscale sections and compensate the input grayscale to the target grayscale using the correction function. The controller 340 may further include a gamma corrector configured to raise the gamma voltage corresponding to the target grayscale to be substantially the same as the gamma voltage corresponding to the input grayscale. The controller 340 may perform the gamma correction based on the target grayscale and provide a corrected gamma voltage VG to the data driver 380.

In some embodiments, the gamma corrector may be physically included in the data driver 380. Here, the controller 340 may generate corrected image data (i.e., target grayscale) DATA2 including the target grayscale information based on the correction parameters H and S and provide the corrected image data DATA2 to the data driver 380. The gamma corrector in the data driver 380 may perform the gamma correction based on the corrected image data DATA2.

The timing controller 340 may receive input image data (i.e., input grayscale) DATA1 from an external graphic source and control the scan driver 360 and the data driver 380. The timing controller 340 may generate first and second control signals CON1 and CON2, and may provide the first and second control signals CON1 and CON2 to the scan driver 360 and the data driver 380, respectively.

The scan driver 360 may provide scan signals to the sub-pixels P1, P2, and P3 of the display panel 320 via the scan lines SL1 through SLn. The scan driver 360 may provide the scan signals to the display panel 320 based on the first control signal CON1 received from the timing controller 340.

The data driver 380 may provide data signals to the sub-pixels P1, P2, and P3 of the display panel 320 via the data lines DL1 through DLm. The data driver 380 may provide the data signals to the display panel 320 based on the second control signal CON2 received from the timing controller 340. In some embodiments, the data driver 380 may include the gamma corrector to convert the target grayscale into the data voltage corresponding to the data signal. The target grayscale (or the target grayscale data) represented by a grayscale level domain may be converted into data voltage represented by a voltage level domain by the gamma corrector. The gamma corrector may adjust upward the gamma voltage corresponding to the target grayscale that is adjusted downward, to emit light as original luminance.

Accordingly, the display device 300 may correct the input grayscale DATA1 to the target grayscale DATA2 based on the correction parameters H and S such that the display panel 320 may display an image with a uniform luminance. The display device 300 may adjust upward the gamma voltage corresponding to the target grayscale DATA2 to the gamma voltage corresponding to the input grayscale DATA1 such that luminance degradation by the luminance downward adjustment of the parameter calculation device may be prevented.

Figure 3:
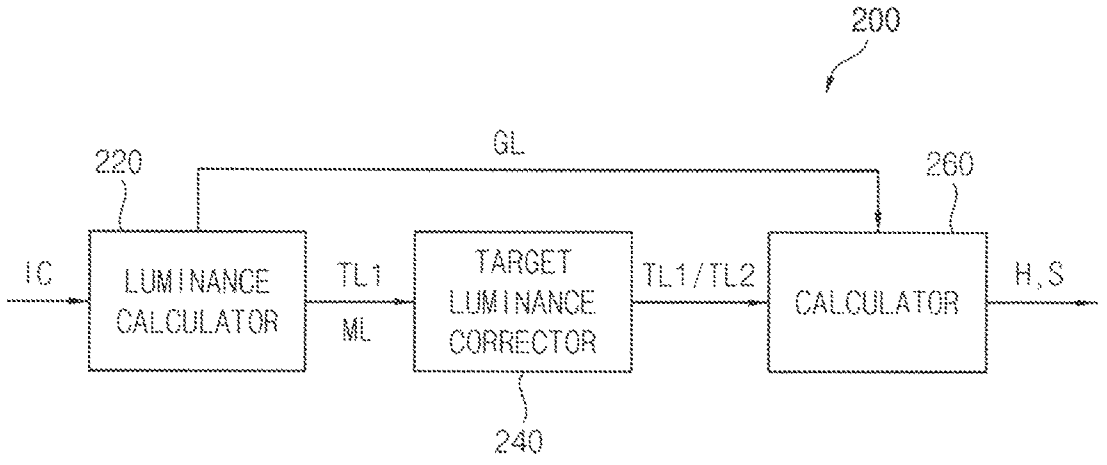
FIG. 3 is a block diagram illustrating an example of a parameter calculation device included in the luminance correction system of FIG. 1.
Figure 4:
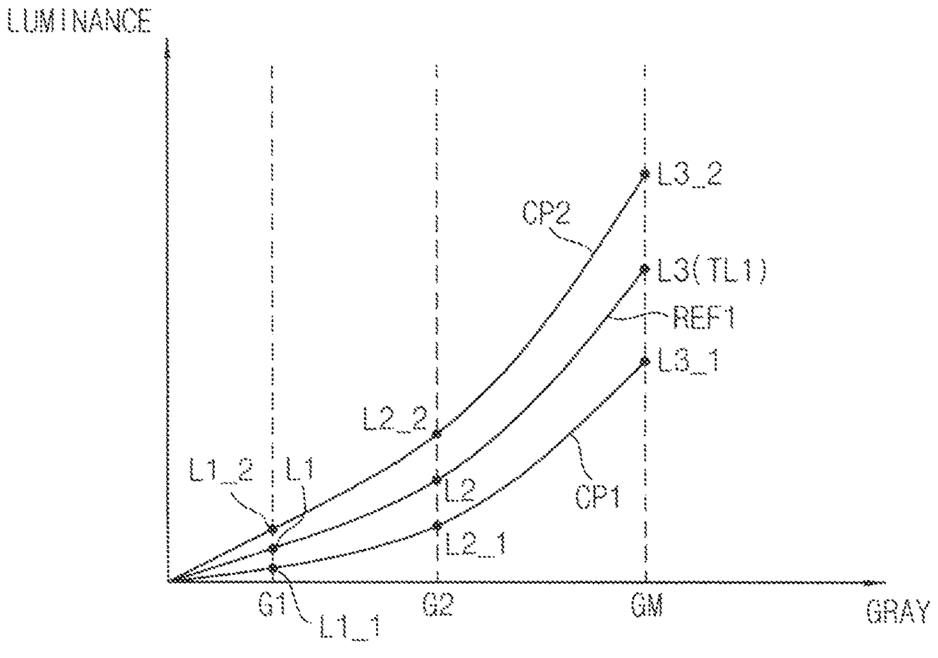
FIG. 4 is a graph illustrating an example of grayscale-luminance curves obtained by the parameter calculation device of FIG. 3.
Figure 5:
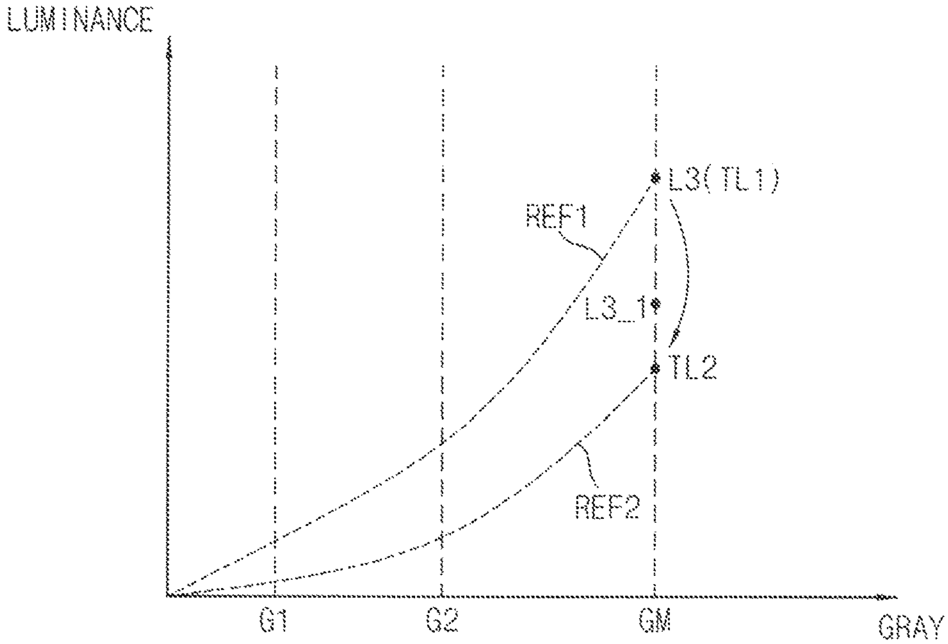
FIG. 5 is a graph illustrating an example of which the grayscale-luminance curve of FIG. 4 is corrected.
Figure 6:
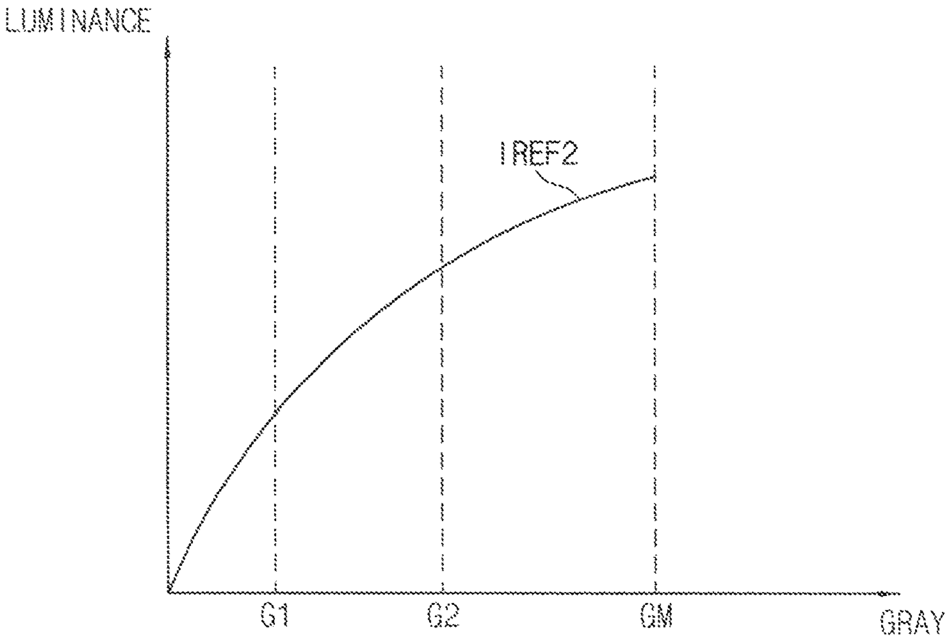
FIG. 6 is a graph illustrating an example of an inverse function of the corrected grayscale-luminance curve of FIG. 5.

FIG. 3 is a block diagram illustrating an example of the parameter calculation device 200 included in the luminance correction system of FIG. 1. FIG. 4 is a graph illustrating an example of grayscale-luminance curves obtained by the parameter calculation device 200 of FIG. 3. FIG. 5 is a graph illustrating an example of which the grayscale-luminance curve of FIG. 4 corrected. FIG. 6 is a graph illustrating an example of an inverse function of the corrected grayscale-luminance curve of FIG. 5.

Referring to FIGS. 3 though 6, the parameter calculation device 200 may include a luminance calculator 220, a target luminance compensator 240, and a calculator 260. The parameter calculation device 200 may calculate correction parameters H and S based on pickup data IC.

In some embodiments, the pickup data IC may include picked up luminance information of a test image corresponding to a maximum grayscale GM. However, the pickup data IC are not limited thereto. For example, the pickup data IC may include picked up luminance information of the test image corresponding to a first reference grayscale G1 or a second reference grayscale G2. Accordingly, the test image may be displayed by one of the first reference grayscale G1, the second reference grayscale G2, and the maximum grayscale GM. Here, the second reference grayscale G2 may be lower than the maximum grayscale GM and the first reference grayscale G1 may be lower than the second reference grayscale G2. For example, the first reference grayscale G1 may be a 35 grayscale, the second reference grayscale G2 may be an 87 grayscale, and the maxim grayscale GM may be a 255 grayscale.

The luminance calculator 220 may calculate first target luminance TL1 and luminance of correction target pixels CP1 and CP2 based on the pickup data IC with respect to the maximum grayscale GM test image. In some embodiments, the luminance calculator 220 may determine average luminance of the sub-pixels in a reference area (e.g., represented as REF in FIG. 2) as the first target luminance TL1. The first target luminance TL1 may be a detected luminance of the reference area REF to which the maximum grayscale is input. The luminance calculator 220 may calculate detected maximum luminances L3_1 and L3_2 based on the pickup data IC. The detected maximum luminances L3_1 and L3_2 may be luminances of the correction target sub-pixels CP1 and CP2, respectively. The detected maximum luminances L3_1 and L3_2 may be detected luminances of the correction target sub-pixels CP1 and CP2 to which the maximum grayscale input.

In some embodiments, the luminance calculator 220 may further calculate luminance L1 of the reference area REF and detected luminances L1_1 and L1_2 of the correction target sub-pixels CP1 and CP2 based on the test image displayed by the first reference grayscale G1. The luminance calculator 220 may further calculate luminance L2 of the reference area REF and detected luminances L2_1 and L2_2 of the correction target sub-pixels CP1 and CP2 based on the test image displayed by the second reference grayscale G2.

The luminance calculator 220 may calculate a reference grayscale-luminance curve REF1 based on the first target luminance TL1 and the calculated luminances L1 and L2. The reference grayscale-luminance curve REF1 may show a luminance change in the reference area REF according to a grayscale change. For example, the reference grayscale-luminance curve REF1 may correspond to an exponential function. A 0 grayscale may correspond to a black luminance and the maximum grayscale GM may correspond to the maximum luminance. Similarly, the luminance calculator 220 may calculate a grayscale-luminance curve (i.e., represented as CP1 in FIG. 4) based on the detected maximum luminance L3_1 and the detected luminances L1_1 and L2_1 of a first correction target sub-pixel CP1. And, the luminance calculator 220 may calculate a grayscale-luminance curve (i.e., represented as CP2 in FIG. 4) based on the detected maximum luminance L3_2 and the detected luminances L1_2 and L2_2 of a second correction target sub-pixel CP2. Here, the first and second correction target sub-pixels CP1 and CP2 may be any sub-pixels outside the reference area REF. The detected luminances L3_1 and L3_2 may be detected maximum luminances ML of the respective first and second correction target sub-pixels CP1 and CP2.

As illustrated in FIG. 4, the luminance of the first correction target sub-pixel CP1 may be lower than the reference area REF with respect to the same grayscale input due to a characteristic variation, and the like. The luminance of the second correction target sub-pixel CP2 may be higher than the reference area REF with respect to the same grayscale input due to the characteristic variation. The luminance correction system 1 may perform the correction operation such that the correction target sub-pixels CP1 and CP2 have substantially the same luminance with respect to a specific input grayscale.

The luminance calculator 220 may provide grayscale-luminance relation information GL including the first target luminance TL1 to the calculator 260.

The target luminance corrector 240 may adjust downward the first target luminance TL1 to be lower than the detected maximum luminance ML and determine the second target luminance TL2. In some embodiments, the target luminance corrector 240 may compare the first target luminance TL1 with each of the detected maximum luminances ML (i.e., L3_2 and L3_1 of FIG. 4) of the correction target sub-pixels CP1 and CP2. The target luminance corrector 240 may adjust downward the first target luminance TL1 to a predetermined second target luminance TL2 when the first target luminance TL1 is higher than a detected maximum luminance ML. The second target luminance TL2 may be determined to be lower than the detected maximum luminance ML. As illustrated in FIG. 5, the target luminance corrector 240 may correct the reference grayscale-luminance curve based on the second target luminance TL2. The corrected reference grayscale-luminance curve REF2 may have the second target luminance TL2 at the maximum grayscale GM. Accordingly, entire luminance corresponding to the grayscales (or the input grayscales) may be adjusted downward such that a grayscale correction margin in a high-grayscale area having the maximum grayscale GM may be secured (or increased).

In some embodiments, the target luminance corrector 240 may adjust downward the reference grayscale-luminance curve REF1 (e.g., a first reference grayscale-luminance curve REF1) to a second reference grayscale-luminance curve REF2 based on the second target luminance TL2, when the first target luminance TL1 is not lower than the detected maximum luminance (e.g., when the detected maximum luminance corresponds to L3_1 of FIG. 4).

In some embodiments, the target luminance corrector 240 may calculate (or maintain) the first reference grayscale-luminance curve REF1 based on the first target luminance TL1 when the first target luminance TL1 is lower than the detected maximum luminance (e.g., when the detected maximum luminance corresponds to L3_2 of FIG. 4).

In this case, it is not necessary to correct the first target luminance TL1 and the target luminance corrector 240 may not perform the correction. Thus, the luminance correction operation with respect to the second correction target sub-pixel CP2 may be performed based on the first target luminance TL1 and the first reference grayscale-luminance curve REF1.

The calculator 260 may determine the correction parameters H and S using a grayscale-luminance curve of the correction target sub-pixel and the reference grayscale-luminance curve REF1 or REF2 such that a luminance of the correction target sub-pixel (e.g., CP1 and CP2) may be substantially the same as the luminance of the reference area REF. In some embodiments, the calculator 260 may calculate a new grayscale function with respect to the correction target sub-pixel based on the reference grayscale-luminance curve REF1 or REF2 and a linearized function of the grayscale-luminance curve of the correction target sub-pixel. In some embodiments, as illustrated in FIG. 6, the calculator 260 may calculate an inverse function IREF2 of the second reference grayscale-luminance curve REF2. The calculator 260 may apply the inverse function IREF2 to the second reference grayscale-luminance curve REF2 to linearize the second reference grayscale-luminance curve REF2. Further, the calculator 260 may apply the inverse function IREF2 to the grayscale-luminance curve of the correction target sub-pixel to linearize the grayscale-luminance curve.

The calculator 260 may calculate the new grayscale function with respect to each correction target sub-pixel CP1 and CP2 based on the corresponding linearized function. The new grayscale function may be represented by linear functions per a predetermined grayscale section, and a slope of each linear function (i.e., represented as S in FIG. 3) and a y-intercept of each linear function (i.e., represented as H in FIG. 3) may be determined as the correction parameters H and S.

Figure 7A:
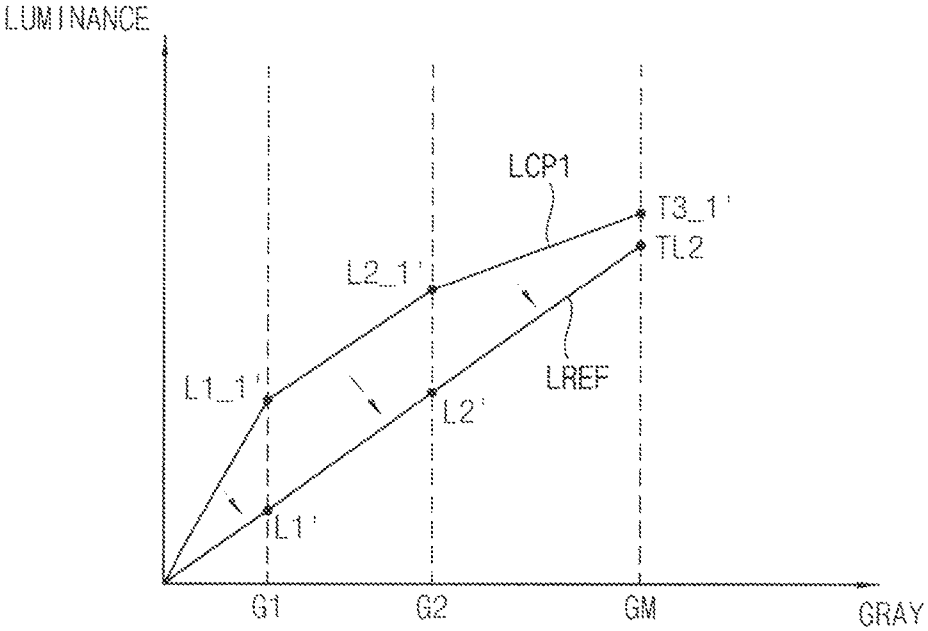
FIGS. 7A and 7B are graphs illustrating linearized grayscale-luminance curves with respect to a reference area and a correction target sub pixel.
Figure 7B:
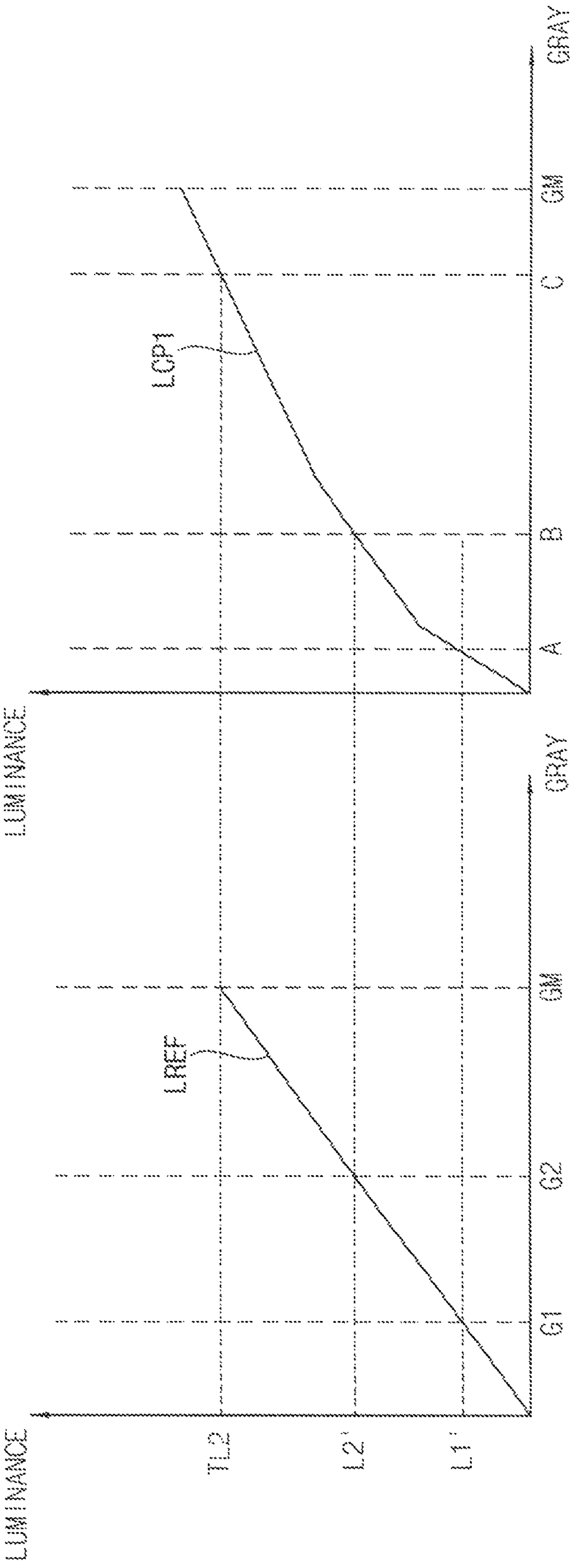
Figure 7C:
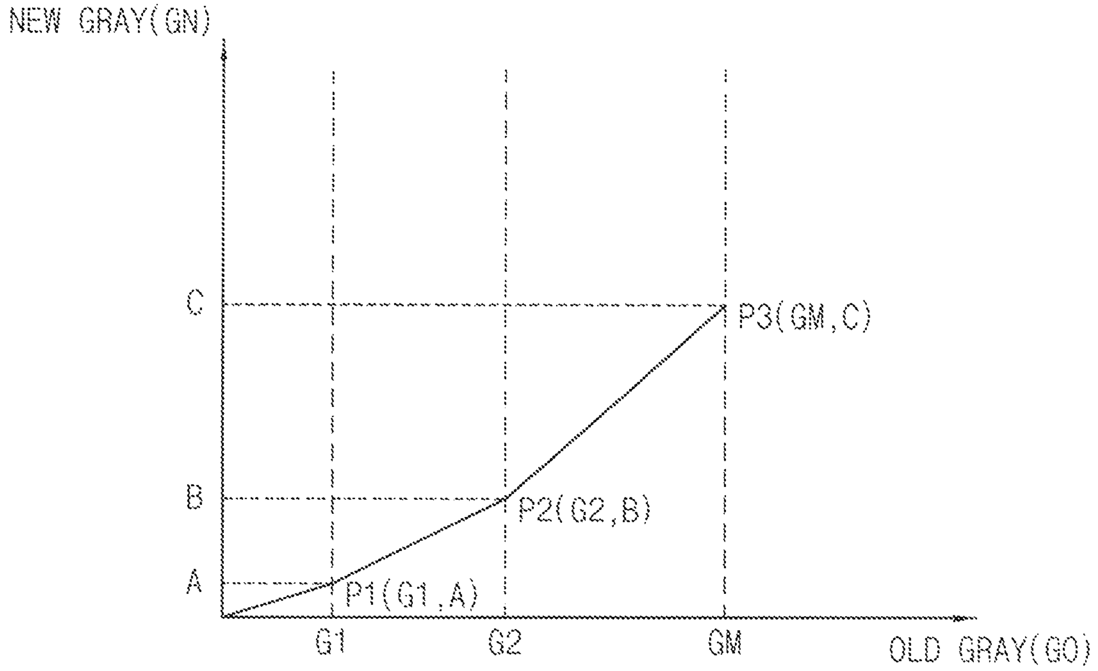
FIG. 7C is a graph illustrating a relation between grayscales before correction and grayscales after correction.

FIGS. 7A and 7B are graphs illustrating linearized grayscale-luminance curves with respect to a reference area and a correction target sub pixel. FIG. 7C is a graph illustrating a relationship between grayscales before correction and grayscales after correction.

Referring to FIGS. 4 through 7C, the luminance calculation device 200, sometimes called the parameter calculation device 200, may calculate the correction parameters to correct a luminance of a correction target sub-pixel CP1.

As illustrated in FIGS. 4 through 6, the first target luminance TL1 that is a maximum luminance detected in the reference area may be adjusted downward to be the second target luminance TL2 such that the first target luminance TL1 may be lower than the detected maximum luminance L3_1 of the correction target sub-pixel CP1. Accordingly, the first reference grayscale-luminance curve (function) REF1 generated based on the first target luminance TL1 may be adjusted downward to be the second reference grayscale-luminance curve (function) REF2. Thus, the luminance correction can be performed with respect to entire grayscales.

As illustrated in FIG. 7A, the second reference grayscale-luminance curve REF2 may be converted into a linearized second reference grayscale-luminance curve LREF by the inverse function IREF2 of the second reference grayscale-luminance curve REF2. For example, the linearized second reference grayscale-luminance curve LREF may be a symmetrical line between the second reference grayscale-luminance curve REF2 of FIG. 5 and the inverse function of FIG. 6, and may be a straight line having only one slope with respect to all grayscales. Here, the maximum luminance corresponding to the maximum grayscale GM may not change and may be the same as the second target luminance TL2. Further, the grayscale-luminance curve (function) of the correction target sub-pixel (e.g., the first correction target sub-pixel CP1) may be converted into a linearized grayscale-luminance curve LCP1 by the inverse function IREF2 of the second reference grayscale-luminance curve REF2. Here, since the second target luminance TL2 has to be lower than the detected maximum luminance L3_1, relations between the linearized grayscale-luminance curves LCP1 and LREF may be similar to FIG. 7A as shown. In some embodiments, the linearized grayscale-luminance curve LCP1 may be divided into 3 sections including a first section from the zero grayscale to the first reference grayscale G1, a second section from the first reference grayscale G1 to the second reference grayscale G2, and a third section from the second reference grayscale G2 to the maximum grayscale GM. Slopes of the sections of the linearized grayscale-luminance curve LCP1 may be different from each other. Luminances L1_1', L2_1', and L3_1' respectively corresponding to the first reference grayscale G1, the second reference grayscale G2, and the maximum grayscale GM may be different from the detected luminances L1_1, L2_1, and L3_1 of FIG. 4. Namely, the luminance of the correction target sub-pixel may be corrected to an approximate value of the luminance of the reference area (i.e., the detected luminance in the reference area) based on the linearized grayscale-luminance curve LCP1.

As illustrated in FIG. 7B, the linearized second reference grayscale-luminance curve LREF have a first luminance L1' corresponding to the first reference grayscale G1, a second luminance L2' corresponding to the second reference grayscale G2, and a third luminance (i.e., the second target luminance TL2) corresponding to the maximum grayscale GM. The linearized grayscale-luminance curve LCP1 with respect to the correction target sub-pixel CP1 may have the first luminance L1' corresponding to a first grayscale A, the second luminance L2' corresponding to a second grayscale B, and the second target luminance TL2 corresponding to a third grayscale C. For example, input image data (i.e., input grayscale data) of the correction target sub-pixel CP1 may be corrected as the linearized grayscale-luminance curve LCP1, the correction target sub-pixel CP1 may emit substantially the same luminance as the reference area. Here, the third grayscale C corresponding to the detected maximum luminance of the correction target sub-pixel CP1 may be always less than the maximum grayscale GM due to the downward adjustment of the first target luminance.

Accordingly, a correction relationship between the grayscale before correction and the grayscale after correction with respect to the correction target sub-pixel may be calculated as illustrated in FIG. 7C. The correction relationship may be calculated by a relation between the linearized grayscale-luminance curve LCP1 with respect to the correction target sub-pixel CP1 and the linearized reference grayscale-luminance curve LREF. The correction relationship may include a plurality of linear functions per a grayscale section. For example, the luminance corresponding to the first reference grayscale G1 at the reference area may be substantially the same as the luminance corresponding to the first grayscale A at the correction target sub-pixel CP1.

In some embodiments, the correction parameters may change according to the grayscale sections. For example, Equation 1 with respect to a section between the first reference grayscale G1 and the second grayscale G2 (hereinafter, a second section) may be calculated based on a slope between a first point P1(G1, A) and a second point P2(G2, B), as represented below.

$$GN=H1+S1*GO, \text{ within the second section} \qquad \text{Equation 1}$$

In Equation 1, GO represents input grayscale (input grayscale data), GN represents corrected grayscale (i.e., target grayscale), H1 represents a first constant, and S1 represents a first slope. H1 and S1 may be correction parameters applied to the input grayscale data GO within the second section.

Equation 2 with respect to a section between the 0 grayscale and the first grayscale G1 (hereinafter, a first section) may be calculated based on a slope between a zero point and the first point P1(G1, A), as represented below.

$$GN=H2+S2*GO, \text{ within the first section} \qquad \text{Equation 2}$$

In Equation 2, GO represents input grayscale (input grayscale data), GN represents corrected grayscale (i.e., target grayscale), H2 represents a second constant, and S2 represents a second slope. H2 and S2 may be correction parameters applied to the input grayscale data GO within the first section.

Equation 3 with respect a section between the second grayscale G2 and the maximum grayscale GM (hereinafter, a third section) may be calculated based on a slope between the second point P2(G2, B) and a third point P3(GM, C), as represented below.

$$GN=H3+S3*GO, \text{ within the third section} \qquad \text{Equation 3}$$

In Equation 3, GO represents input grayscale (input grayscale data), GN represents corrected grayscale (i.e., target grayscale), H3 represents a third constant, and S3 represents a third slope. H3 and S3 may be correction parameters applied to the input grayscale data GO within the third section.

In some embodiments, Equations 2 and 3 may be calculated by interpolations using Equation 1.

Accordingly, the parameter calculation device 200 may calculate correction parameters H1, H2, H3, S1, S2, and S3 with respect to every grayscale section for correcting input grayscales such that the correction target sub-pixel emits substantially the same luminance as the reference area with respect to the same input grayscale. Then, the parameter calculation device 200 may provide the correction parameters H1, H2, H3, S1, S2, and S3 to the display device 300. Further, the parameter calculation device 200 may adjust downward the luminance of the reference area to be less than the detected luminance of the correction target sub-pixel with respect to the same input grayscale such that the correction margin of the high-grayscale section (e.g., the third section) may be sufficiently secured (or increased). Thus, the accuracy of the luminance correction and luminance uniformity may be improved in a condition that the sub-pixels have various luminance variations.

Figure 8:
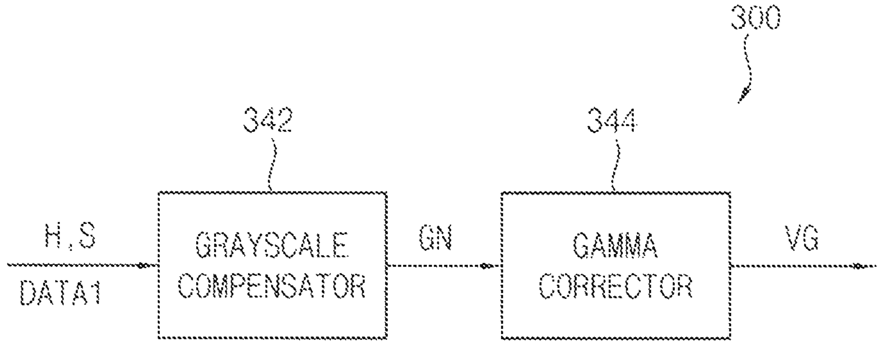
FIG. 8 is a block diagram illustrating an example of the display device of FIG. 2.

FIG. 8 is a block diagram illustrating an example of the display device of FIG. 2.

Referring to FIGS. 7C and 8, the display device 300 may include a grayscale compensator 342 and a gamma corrector 344. The display device 300 may further include a display panel having a plurality of sub-pixels, a scan driver providing scan signals to the sub-pixels, a data driver providing data signals to the sub-pixels, and a controller receiving input grayscale DATA1 (input grayscale data) from external graphic source and controlling the scan driver and the data driver.

Actually, the parameter calculation device 200 may calculate the correction parameters H and S based on the pickup data to provide the parameters H and S to the display device 300, and the display device 300 may correct (compensate) the input grayscale using the correction parameters H and S and the equations to the target grayscale.

The display panel may display a test image based on the input grayscale DATA1.

In some embodiments, the grayscale compensator 342 and the gamma corrector 344 may be included in the controller 340.

The grayscale compensator 342 may receive the input grayscale DATA1 and compensate the input grayscale DATA1 to a target grayscale GN. The grayscale compensator 342 may calculate a correction function having the correction parameters H and S applied to each of predetermined grayscale sections. The grayscale compensator 342 may compensate the input grayscale DATA1 to the target grayscale GN using the correction function. The correction function may correspond to the relationship between the grayscale before correction and the grayscale after correction with respect to the correction target sub-pixel of FIG. 7C. The grayscale compensator 342 may receive the correction parameters H and S with respect to each of the grayscale sections (e.g., the first through third grayscale sections of FIG. 7C) from the parameter calculation device 200. In some embodiments, the grayscale compensator 342 may calculate Equations 1 to 3 above explain based on the correction parameters H and S. Accordingly, the grayscale compensator 342 may calculate the target grayscale GN using the corresponding Equations 1 to 3 corresponding to a grayscale section including the input grayscale DATA1.

In some embodiments, the number of bits of the target grayscale GN may be the same as the number of bits of data of the input grayscale DATA1. Since the luminance is adjusted downward, it is not necessary to increase the target grayscale, especially the maximum grayscale of the corrected grayscale.

The grayscale compensator 342 may compensate the input grayscale DATA1 (e.g., GO of FIG. 7C) to the target grayscale GN (e.g., GN of FIG. 7C) using the correction function such that luminance of the correction target sub-pixel is substantially the same as luminance of the reference area. For example, when the input grayscale DATA1 with respect to the correction target sub-pixel is within a 0 grayscale (a minimum grayscale) to a 255 grayscale (a maximum grayscale), the corrected target grayscale GN may be within the 0 grayscale to a 240 grayscale. Accordingly, a luminance of the reference area to which the 255 grayscale input is applied may be substantially the same as a luminance of the correction target sub-pixel to which the 240 grayscale input is applied. Here, since a target luminance (i.e., a maximum luminance of the correction target sub-pixel) are adjusted downward by the parameter calculation device 200, a maximum value of the corrected target grayscale corresponding to the target luminance (e.g., the third grayscale C of FIG. 7C) may be always less than the maximum value (maximum grayscale) GM of the input grayscale DATA1. Thus, the luminance correction margin in the high-grayscale area may be improved. However, in this case, since the maximum grayscale corresponding to the maximum luminance decreases, entire luminance may be reduced.

The gamma corrector 344 may correct a gamma voltage corresponding to the target grayscale GN that is lowered from the input grayscale DATA1, so that a normal luminance corresponding to the input grayscale DATA1 can be output.

To prevent the luminance from being lowered, the gamma corrector 344 may adjust upward a gamma voltage corresponding to the target grayscale GN to be substantially the same as a gamma voltage corresponding to the input grayscale DATA1. In some embodiments, the gamma corrector 344 may adjust upward the gamma voltage such that a maximum grayscale of the target grayscale GN corresponding to the second target luminance corresponds to the first target luminance. For example, when the gamma voltage corresponding to the 255 grayscale is about 5V and the gamma voltage corresponding to the 240 grayscale is about 4.5V, the gamma corrector 344 may adjust upward the gamma voltage of the correction target sub-pixel corresponding to the 240 grayscale to be about 5V. Similarly, gamma voltages corresponding to other target grayscales GN may be adjusted upward. The gamma corrector 344 may correct upward the gamma voltage corresponding to the target grayscale (corrected grayscale) GN to an approximate value of a gamma voltage of luminance corresponding to the input grayscale DATA1. Thus, the gamma voltage with respect to the target grayscale GN that is lowered from the input grayscale DATA1 may be compensated by the corrected gamma voltage VG, and a normal luminance corresponding to the input grayscale DATA1 can be output.

As described above, in the luminance correction based on the image pick up, the luminance correction system 1 according to example embodiments may calculate the luminance correction parameters H and S by adjusting downward the target luminance to be lower than a detected luminance at the correction target sub-pixel, so that the luminance correction margin in the high-grayscale section including the maximum grayscale may be secured. Thus, the accuracy of the luminance correction and luminance uniformity may be improved in a condition that the sub-pixels have various luminance variations. In addition, the display device in the luminance correction system 1 may perform the gamma correction that adjusts upward the gamma voltage with respect to the corrected target grayscale GN based on the luminance correction parameters H and S, such that luminance degradation by the operations of the luminance downward adjustment of the parameter calculation device may be prevented. Thus, the display device 300 may output the normal and uniform luminance corresponding to the input grayscale DATA'.

Figure 9:
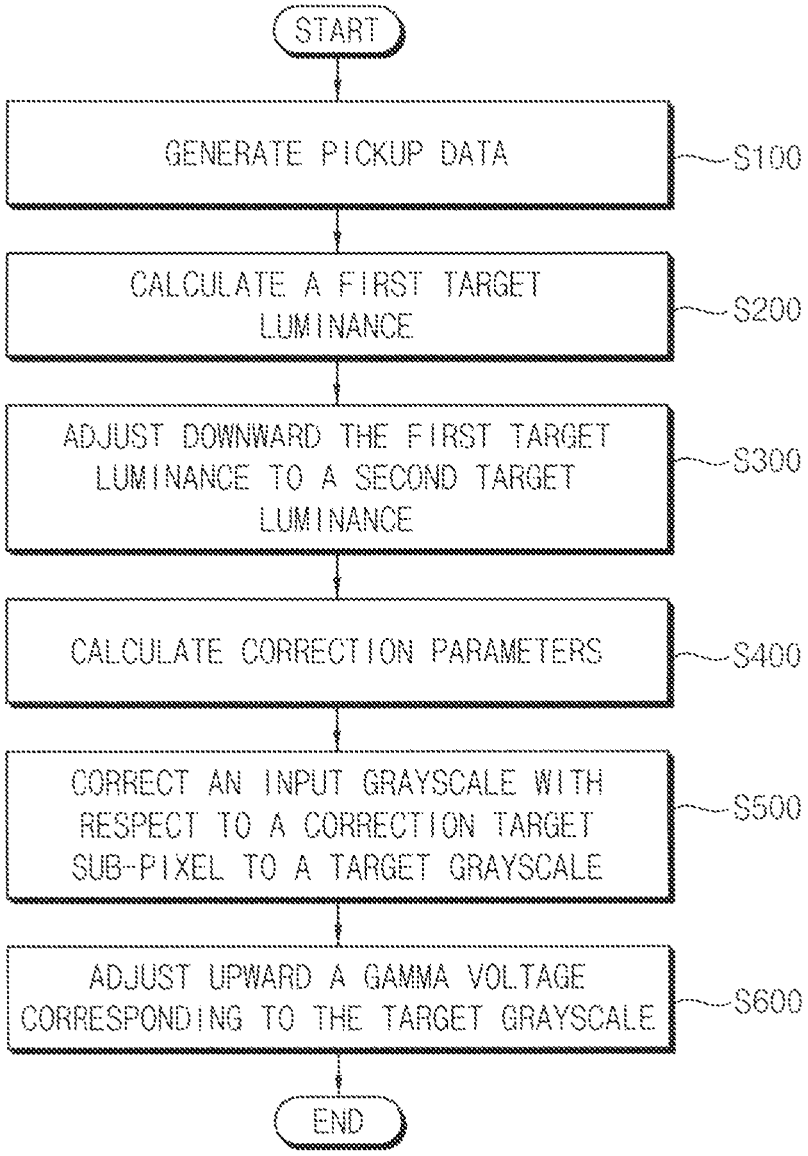
FIG. 9 is a flow chart of a method for correcting luminance of a display panel according to example embodiments.

FIG. 9 is a flow chart of a method for correcting luminance of a display panel according to example embodiments.

Referring to FIG. 9, the method for correcting luminance of the display panel may include generating pickup data by picking up an image displayed on a display panel, the image corresponding to a predetermined maximum grayscale (operation S100). The method may further include calculating a first target luminance that is a maximum luminance of a reference area in the display panel and a detected luminance that is luminance of a correction target sub-pixel based on the pickup data (operation S200). The method may further include determining a second target luminance lower than the first target luminance by correcting the first target luminance (operation S300). The method may further include calculating a correction parameters for correcting an input grayscale of a correction target sub-pixel to be a target grayscale based on a grayscale-luminance curve of the reference area including the second target luminance (operation S400). The method may further include correcting the input grayscale of the correction target sub-pixel to the target grayscale based on the correction parameters (operation S500), and adjusting upward a gamma voltage corresponding to the target grayscale to have a luminance corresponding to the input grayscale (operation S600). Accordingly, the display device may generate a data voltage for providing to the display panel based on the corrected gamma voltage and display a corrected image having uniform luminance.

The target luminance is a luminance of the reference area. The input grayscale with respect to the correction target sub-pixel may be corrected to emit substantially the same luminance as the target luminance.

In some embodiments, the second target luminance may be determined to be lower than a detected maximum luminance detected at the correction target sub-pixel. Thus, the grayscale-luminance curve of the reference area may be adjusted downward. The correction parameters may be determined based on the downward adjusted grayscale-luminance curve. The correction margin in a high-grayscale area including the maximum grayscale may be increased for the downward adjustment of the target luminance.

In some embodiments, calculating the correction parameters (operation S400) may include calculating the luminance of the reference area each of a first reference grayscale and a second reference grayscale and a luminance of the correction target sub-pixel based on results by picking up the image displaying the first reference grayscale and the second reference grayscale. Calculating the correction parameters may further include calculating the grayscale-luminance curve of the reference area, a first reference grayscale-luminance curve of the first reference grayscale, and a second reference grayscale-luminance curve of the second reference grayscale based on the luminance of the reference area and the luminance of the correction target sub-pixel, and calculating the correction parameter by linearizing the grayscale-luminance curve, the first reference grayscale-luminance curve, and the second reference grayscale-luminance curve.

The gamma voltage may be adjusted upward (operation S500) such that a maximum value of the target grayscale corresponding to the second target luminance changes to be matched to the first target luminance. Accordingly, the downward adjusted luminance may be compensated, and thus the display device may output normal luminance corresponding to the input grayscale.

Since the method for correcting the luminance of the display panel including the operations S100 through S600 are described above with reference to FIGS. 1 through 8, duplicated descriptions will not be repeated.

As described above, the method for correcting the luminance of the display panel may adjust downward the target luminance to secure (or increase) the grayscale correction margin, and perform the gamma correction that adjusts upward the gamma voltage with respect to the corrected target grayscale to recover the downward adjusted target luminance. Thus, the accuracy of the luminance correction and luminance uniformity may be improved in a condition that the sub-pixels have various luminance variations.

The present embodiments may be applied to any luminance correction system for correcting luminance of display devices.

The foregoing is illustrative of example embodiments, and is not to be construed as limiting thereof. Although a few example embodiments have been described, those skilled in the art will readily appreciate that many modifications are possible in the example embodiments without materially departing from the novel teachings of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A luminance correction system including a display device, comprising:

an image pickup device configured to pick up a test image displayed on a display panel and generate pickup data;

a parameter calculation device configured to calculate a first target luminance that is a maximum luminance of a reference area in the display panel and a detected maximum luminance that is a luminance of a correction target sub-pixel based on the pickup data with respect to a maximum grayscale, determine a second target luminance by correcting the first target luminance, and calculate correction parameters for calculating a target grayscale that compensates an input grayscale of the correction target sub-pixel; and the display device including the display panel, the display device configured to compensate the input grayscale of the correction target sub-pixel to the target grayscale based on the correction parameters and generate a data voltage by adjusting upward a gamma voltage corresponding to the target grayscale, wherein the parameter calculation device comprises:

a luminance calculator configured to determine an average luminance of at least one sub-pixel included in the reference area as the first target luminance based on the pickup data having the maximum grayscale and calculate the detected maximum luminance of the correction target sub-pixel;

a target luminance corrector configured to adjust downward the first target luminance to be lower than the detected maximum luminance and determine the second target luminance when the first target luminance is not lower than the detected maximum luminance; and a calculator configured to determine the correction parameters using a grayscale-luminance curve of the correction target sub-pixel and a reference grayscale-luminance curve such that luminance of the correction target sub-pixel is substantially the same as luminance of the reference area, the reference grayscale-luminance curve being a grayscale-luminance curve of the reference area.

2. The system of claim 1, wherein the parameter calculation device determines the second target luminance to be lower than the detected maximum luminance.

3. The system of claim 2, wherein the parameter calculation device adjusts downward a grayscale-luminance function of the reference area based on the second target luminance.

4. The system of claim 2, wherein the parameter calculation device does not correct the first target luminance to be the second target luminance and calculates the correction parameters based on the first target luminance when the first target luminance is lower than the detected maximum luminance.

5. The system of claim 1, wherein the display device adjusts upward the gamma voltage such that a maximum value of the target grayscale corresponding to the second target luminance changes to be matched to the first target luminance.

6. The system of claim 4, wherein the maximum value of the target grayscale is lower than the maximum grayscale.

7. The system of claim 1, wherein the test image is displayed as one of a first reference grayscale, a second reference grayscale, and the maximum grayscale, and wherein the second reference grayscale is lower than the maximum grayscale and the first reference grayscale is lower than the second reference grayscale.

8. The system of claim 7, wherein the luminance calculator further calculates luminance of the reference area corresponding to each of the first and second reference grayscales and detected luminance of the correction target sub-pixel.

9. The system of claim 1, wherein the calculator performs a linearization to the reference grayscale-luminance curve and the grayscale-luminance curve of the correction target sub-pixel to calculate the correction parameter.

10. The system of claim 1, wherein the grayscale-luminance curve of the correction target sub-pixel corresponds to an exponential function calculated based on the detected luminance and the detected maximum luminance.

11. The system of claim 1, wherein the target luminance corrector adjusts downward the reference grayscale-luminance curve based on the second target luminance when the first target luminance is not lower than the detected maximum luminance.

12. The system of claim 1, wherein the target luminance corrector calculates the reference grayscale-luminance curve based on the first target luminance of the reference area when the first target luminance is lower than the detected maximum luminance.

13. The system of claim 1, wherein the display device comprises:

a grayscale compensator configured to calculate a correction function having the correction parameters applied to each of predetermined grayscale sections, and compensate the input grayscale to the target grayscale using the correction function; and a gamma corrector configured to adjust upward the gamma voltage corresponding to the target grayscale to be substantially the same as a gamma voltage corresponding to the input grayscale.

14. The system of claim 13, wherein the number of bits of the target grayscale is the same as the number of bits of data of the input grayscale.

15. A method for correcting luminance of a display panel, comprising:

generating pickup data by picking up an image displayed on the display panel, the image corresponding to a predetermined maximum grayscale;

calculating a first target luminance that is a maximum luminance of a reference area in the display panel and a detected luminance that is luminance of a correction target sub-pixel based on the pickup data;

determining a second target luminance lower than the first target luminance by correcting the first target luminance;

calculating correction parameters for correcting an input grayscale of a correction target sub-pixel to be a target grayscale based on a grayscale-luminance curve of the reference area including the second target luminance;

correcting the input grayscale of the correction target sub-pixel to the target grayscale based on the correction parameters; and adjusting upward a gamma voltage corresponding to the target grayscale to have a luminance corresponding to the input grayscale, wherein calculating the correction parameters comprises:

calculating the luminance of the reference area corresponding to each of a first reference grayscale and a second reference grayscale and a luminance of the correction target sub-pixel based on results by picking up the image displaying the first reference grayscale and the second reference grayscale;

calculating the grayscale-luminance curve of the reference area, a first reference grayscale-luminance curve of the first reference grayscale, and a second reference grayscale-luminance curve of the second reference grayscale based on the luminance of the reference area and the luminance of the correction target sub-pixel; and calculating the correction parameter by linearizing the grayscale-luminance curve, the first reference grayscale-luminance curve, and the second reference grayscale-luminance curve.

16. The method of claim 15, wherein the second target luminance is determined to be lower than a detected maximum luminance detected at the correction target sub-pixel.

17. The method of claim 15, wherein adjusting upward the gamma voltage corrects the gamma voltage such that a maximum value of the target grayscale corresponding to the second target luminance changes to be matched to the first target luminance.

18. The method of claim 15, wherein the number of bits of the target grayscale is the same as the number of bits of data of the input grayscale.

* * * * *